June 20, 1933.  J. LAST  1,914,813
TORQUE CONVERSION AND TRANSMISSION
Filed March 5, 1931   6 Sheets-Sheet 4

INVENTOR:
James Last

Patented June 20, 1933

1,914,813

UNITED STATES PATENT OFFICE

JAMES LAST, OF CARSHALTON, ENGLAND

TORQUE CONVERSION AND TRANSMISSION

Application filed March 5, 1931, Serial No. 520,366, and in Great Britain March 7, 1930.

This invention relates to power transmission devices wherein torque or energy is transmitted from one rotary element to another (as from a driving to a driven shaft), of the type in which the torque or energy transmitted varies automatically in accordance with a function of the load or the demands of the driven shaft.

It is recognized that several proposals have been made for providing devices adapted automatically to transmit or convert torque in a manner variable with the load through the medium of oscillating or rotating masses which promoted negative as well as positive impulses of torque, the former being converted by supplementary impulse reversing means (such as ratchet and pawl mechanism) to a positive sense.

The object of the present invention is to provide an improved method and means for the transmission of power wherein is provided an augmentation or conversion of torque through reactions solely dependent for fulcra upon the driving and driven shafts.

While the invention is more particularly intended as an automatically variable gear wherein power is transmitted according to load conditions and demands, it may also be employed as a clutch or coupling device between two shafts such as will afford lag or relative movement when predetermined load conditions are exceeded or where shocks or dangerous resistances are encountered.

This invention employs as an underlying principle doing work upon or exciting a "resilient" oscillable system or medium (i. e. one capable of absorbing energy by strain, displacement or distortion under stress) to absorb energy, and independently damping the oscillation of the system to deliver the energy and unstrain the system.

It is to be noted that in the embodiments of the invention described, free oscillation does not generally endure for more than a quarter of a cycle.

By independent driving and driven members are meant members between which there is an absence of positive connection such that either may be rotated indefinitely while the other is held stationary.

Referring to the accompanying drawings:—

Figure 1:
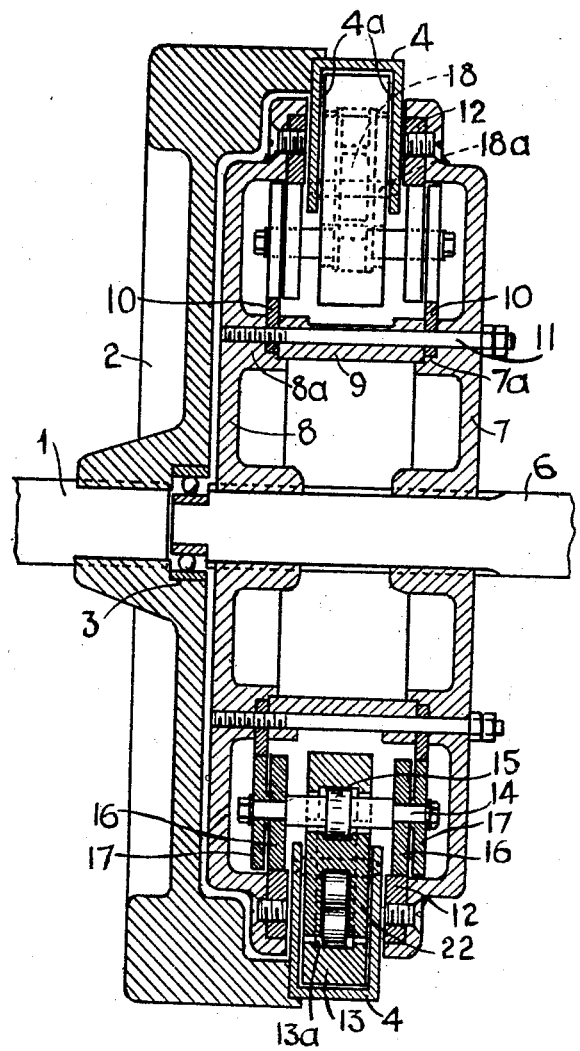
Figure 1 is a view, partly sectional and partly elevational, of a constructional embodiment of the invention employing a cam form.

Describing (with reference to Figures 1 and 2 of the drawings) one constructional form of the invention, in which torque transmission is effected by mechanical oscillable power transfer devices wherein centrifugal force is employed, a driving shaft 1 to which power to be transmitted is applied, has rigidly secured thereto a disc or flywheel element 2 which may conveniently carry a bearing race 3 for the end of a driven shaft located coaxially with the driving shaft. Towards the periphery of the flywheel a driving ring or housing 4 is secured. This driving ring is provided with a plurality of cavities 5 for the accommodation of oscillable transmission devices which each comprise a mass A and a mass B to be described more particularly hereinafter.

The driven shaft 6 has rigidly mounted upon it a pair of spaced discs or cam housings 7 and 8. A distance piece or annulus 9 is mounted between the discs 7 and 8 which also with the aid of flanges 7a, 8a form a seating for a pair of external cams 10 which may be secured by bolts 11 which in addition serve to secure the discs 7 and 8 and annulus 9 together. Towards the periphery of the discs 7 and 8 each is inwardly rimmed to support an internal cam 12 positioned out of the adjacent plane of the cams 10.

As the oscillable transmission elements in the cavities 5 of the housing 4 are identical in construction, it will only be necessary to describe one of such.

Each transmission device comprises a ring 13 (of mass A) the axis of which is at 13b. The internal periphery of the ring 13 is formed as a flanged track 13a. The mass B includes a spindle 14 having an enlarged rolling portion 15 which has rolling contact with the track 13a. The spindle 14 is provided at each end with a pair of cam-engaging rollers 16, 17. The rollers 16 are aligned with and adapted under running conditions to engage the internal cams 12 while the rollers 17 are aligned with the external cams 10 with which they may have a running contact or with which they may engage under conditions of rest, these cams being adapted mainly to serve retentive purposes for maintaining the position of the transmission unit under rest conditions.

The cams 10 as illustrated in the drawings have four lobes and the internal cams 12 have corresponding portions of increasing and decreasing radius. Thus it will be seen that the rollers 17 of the transmission device in rotating through each quarter revolution with respect to the driven shaft, travel through 45° in which they are decreasing their radius from the axis of shaft 1 and 45° in which they are increasing their radius.

Figure 2:
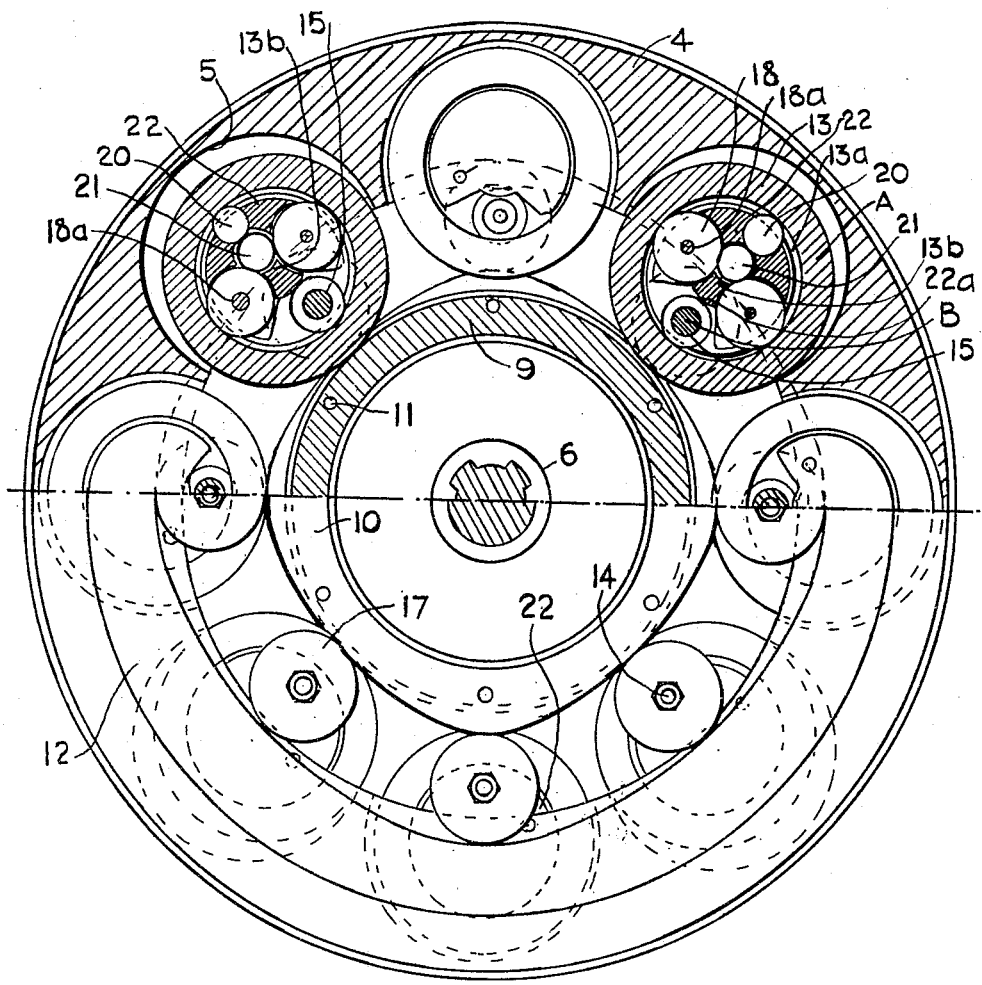
Figure 2 is an end elevation, partly broken away and showing certain parts in section, of the construction shown in Figure 1.

It will be observed that in the drawings, Figure 2, the cam rollers 16, that is to say the axes of the masses B, are shown in the positions of maximum and minimum radius, and that the two transmission devices seen in section will, upon relative rotation between the driver and driven element, proceed from the position of minimum radius towards that of maximum radius.

Within the ring 13 a roller 18 is rotatably mounted upon a spindle (the axis of which is indicated at 18a) secured in the lateral walls 4a of the cavity 5 of the housing 4. This roller 18 serves as a means of communicating revolution to the masses A and B about the axis of the driving member. The position of the ring 13 with respect to the axis 18a is maintained by aid of rollers 19, 20 and an intermediate bearing roller 21. It will be seen that each of the rollers 18, 19 and 20 have rolling contact with the roller 21 and that they also have rolling contact with the track 13a. A cage or housing member 22 is provided with cavities for the accommodation of the rollers 18, 19, 20 and 21, the roller 19 being also pivotally mounted upon a spindle secured in the walls of the cage. The roller 20 is seated with a free running fit in the housing while the cavities for the other rollers afford greater clearances. The housing 22 is provided with an arcuate clearance 22a to enable the roller 15 to have an angular displacement relatively to the cage 22 and rollers 18 and 19. It will thus be seen that the transmission device embodying the masses A and B can swing about the axis 18a which is fixed with respect to the housing 4) under the control and actuation of the cams 12 through thrusts taken or communicated by the roller 15 (mass B). It will also be observed that the positioning of the parts has the same effect as though the axis 18a of the roller 18 and the axis of the roller 15 were connected by links to the axis 13b (centre of mass A) of the ring 13.

It will be understood that the mass A comprises the sum of the masses of the ring 13, housing 22 and rollers 19, 20 and 21, while the mass B comprises the masses of the spindle 14 and enlarged roller portion 15 and the pairs of cam rollers 16, 17. To the mass B is added in tangential movements a function of the mass of the ring 13.

As the driving shaft 2 and housing 4 rotate the centrifugal force induced tends to swing the mass A radially outward about the axis 18a. When conditions are such that the transmission elements rotate relatively to the cams 12 it will be observed that the outward swing of the mass A is controlled by the mass B under the influence of its rollers 16 in engagement with the cams 12 when the rollers are travelling towards the position of maximum radius of the cams (hereinafter referred to as the outward cam phase), while when the rollers are travelling from the position of maximum radius to that of minimum radius of the cams (inward cam phase) the mass A is constrained or drawn inwardly, against the action of centrifugal force, by the action of the cam surface upon the rollers and by the contact between the roller 15 (of mass B) on the internal track 13a of the ring 13.

Figure 3:
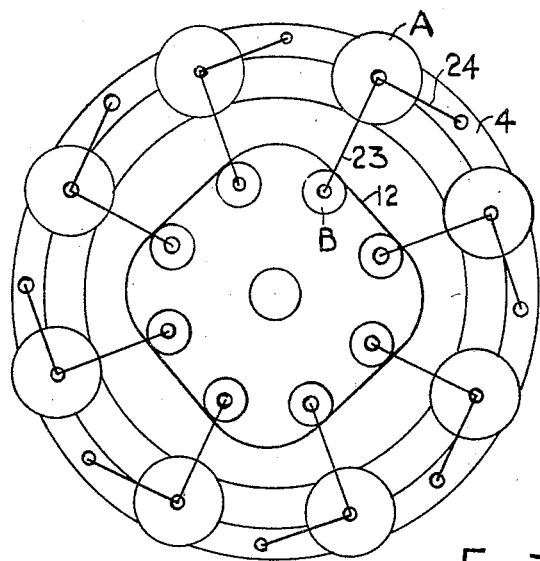
Figure 3 is a diagram explanatory of the operation of the construction shown in Figures 1 and 2.

The operation of the gear may be most conveniently described with reference to Figure 3 of the drawings which shows the masses A and B in diagrammatic form joined together by a link 23 and connected to a driving housing 4 by a second link 24, these connections being equivalent to the arrangement with the rings 13 as seen in Figures 1 and 2. The masses B are indicated as rollers which engage and run upon the cam 12 representing the driven member.

Assuming that the cam is held stationary and that the driver is rotated in a clockwise direction (as indicated by the arrow), and considering a single element consisting of the linked masses A and B during movement through an angle of 90°, it will be evident that as the mass B proceeds in the outward cam phase its radial distance from the centre will progressively increase and such movement will permit an outward radial movement of the mass A to take place under the applied centrifugal force due to the rotation of this mass. With this outward movement of the mass A and the constant angular velocity assumed imparted thereto by the driver, the mass A acquires and stores additional energy which is represented by an increase of linear velocity.

It is to be noted that the centrifugal force on A due to its revolution by the driver is caused to bear partly upon B by the control of the later exerted by the cam which constitutes means for accelerating the mass B. Further, the work done by the driver on A during its outward movement is represented by an increased linear velocity, during its radial movement, which is a resultant of its radial velocity and its increased tangential velocity. Thus this work may be resolved into two components which may be shown to be equal. Of these, one is represented, finally, by the increased tangential velocity of A on reaching its greatest radius and the other, (since A has, at this point, no radial velocity,) has been converted, through reaction with the outward slope of the cam, into an increased tangential energy of the accelerable mass B, the ratio of the masses being preferably chosen so that the increment of the energy of B results in its resuming at its greatest radius the angular velocity which it had at its least radius.

By similar reasoning, since B is now radially at rest, the increase in the energy of B is due to a tangential resultant force, taken over the whole outward phase, derived from an equal and opposite tangential resultant exerted on the cam, producing a negative moment on the stationary driven member.

Assuming the mass B now to have passed its maximum distance from the centre of the stationary driven member and to be proceeding on the inward cam phase (in which counter acceleration is introduced), the mass A is constrained to decrease its radius under the influence of the cam surface acting through the mass B and its linkage to the mass A. As the angular velocity of mass A is maintained constant by the driver, the decrease of radius imposes a corresponding decrease in linear velocity, thus setting free the additional energy acquired under the previously described condition, which is restored to the driver. The energy requisite to cause the inward movement of mass A, in opposition to the centrifugal force, is derived from the energy stored in the mass B by increasing its tangential velocity as previously described. The inward cam surface causes the mass B to decrease its radius and lose its velocity in expending its energy to retract the mass A until the minimum radius of the cam surface is reached.

In this phase the masses A and B each lose equal amounts of energy, the tangential resultant being proportionally greater in consequence, and an equal and opposite force is exerted on the cam giving a corresponding positive moment to the driven member.

When the cam is stationary and in consequence no net work is absorbed from the driver, the transfers of energy are thus as follows:—On the one hand during the outward cam phase additional energy is taken up in the form of increased linear velocities of masses A and B, while on the other hand during the inward cam phase the acquired energy of mass B is returned to mass A (in displacing it inward) which retains it as potential energy, itself returning its acquired tangential energy to the driver.

As observed above there is a negative moment upon the driven member during the outward cam phase. The value of this moment depends on the centrifugal force exerted by the masses minus an amount due to the decreased inward acceleration of the masses consequent upon the inclination of the outward phase of the cam. The positive moment upon the driven member during the inward cam phase has a value dependent upon the centrifugal force exerted by the masses plus an amount due to their increased inward radial acceleration consequent upon the inclination of the inward phase of the cam. It will, therefore, be appreciated that the negative moment is in all cases less than the positive moment applied to the driven member.

When the driven member is free to revolve a torque will be given to the driven member equal to the difference between the positive and negative moments referred to above and result in the rotation of the driven member at a velocity dependent upon the load.

It will be understood that the case above discussed with the driven member stationary is one of the limiting cases of the more general set of conditions when the driving and driven members rotate at different angular velocities, the other limiting case occurring when the driving and driven members rotate at the same angular velocities.

If the cam should rotate with $(n)$ times the velocity of the driver, $(n)$ being some fraction, the tangential force producing the increase of absolute linear velocity of the mass B will do work both positively on the mass B and negatively on the cam, the angle through which the negative work, due to this force, is applied being $(n)$ times that swept by the driver. Since on completion of the outward phase the angle subtended by the outward slope is $(1-n)$ times the angle swept by the driver, the positive work done by the cam on the mass B is to that done negatively on the cam as $(1-n):n$, the work required from the driver to complete the whole increase of linear velocity of the mass B to represent the radial work on the mass A being ($n$) times the whole work required for the outward movement of the mass A whether the cam is stationary or not.

On entering the inward phase the tangential force exerted by the cam negatively on the mass B for the retraction of the mass A is exerted positively on the cam through ($n$) times the angle swept by the driver and, when retraction is complete, this force will have been exerted on the mass 4 through the angle subtended by the inward slope. Thus the whole work of retracting is divided between the cam and the mass B in the ratio $n : (1-n)$. As the negative work done on the cam has been shown to be equal to the work absorbed from the driver and also to be ($n$) times the whole radial work, which is itself half the whole work of retraction, the net positive work is equal to the work absorbed before from the driver to complete the outward radial movement of the mass A.

Again, since the work absorbed from the driver was applied over the angle swept by the cam plus the angle subtended by the outward slope (which is equal to that subtended by the inward slope) and the angle swept by the cam while subjected to the positive work is ($n$) times this whole angle, the ratio of the moment delivered to the cam to that applied by the driver is as $1 : n$. Thus the moment delivered is to the moment applied as the velocity of the driver is to that of the cam.

Finally, when $n$ becomes unity equilibrium is reached at the point where the inwardly moving mass B has given such an inward radial velocity to the mass A as represents the energy corresponding to the increased linear velocity at the same instant, of the following outwardly moving masses B due to the radial work done on its mass A by the driver, the form of the cam being such as to conform to these simultaneous conditions when the value of the said energy corresponds to the required absorption at the given angular velocity.

For certain applications an inequality of cam slope may be adopted provided the accompanying factors of mass and energy absorption are allowed for.

It is observed that a decision as to the use of a symmetrical cam or otherwise rests mainly on the nature of the source of energy, coupled to the driver, with respect to the flexibility of its angular velocity, together with the requirements of critical or maximum amplification of delivered moment. The circumstance must be borne in mind that a prime mover may vary its energy output alternatively by modification of its angular velocity at constant moment or by adjustment of its moment at constant angular velocity, there being all intermediate conditions possible additionally.

It is proper to point out that continuous absorption of energy at full load intensity through the whole range of $n$ between unity and infinity (when the cam is stationary) is inconsistent with the requirement of a finite starting moment to satisfy which is one of the objects of the invention.

The foregoing has assumed a constant angular velocity of the driver. It will be seen that the capacity of the construction in terms of power (i. e. work and time) will be proportional to the square of the absolute angular velocity of the driver and again directly to this velocity, since the moment varies as the centrifugal force and the angular distance varies as the angular velocity. Thus the power absorbed varies as ($n$) times the cube of the angular velocity of the driver.

Figure 4:
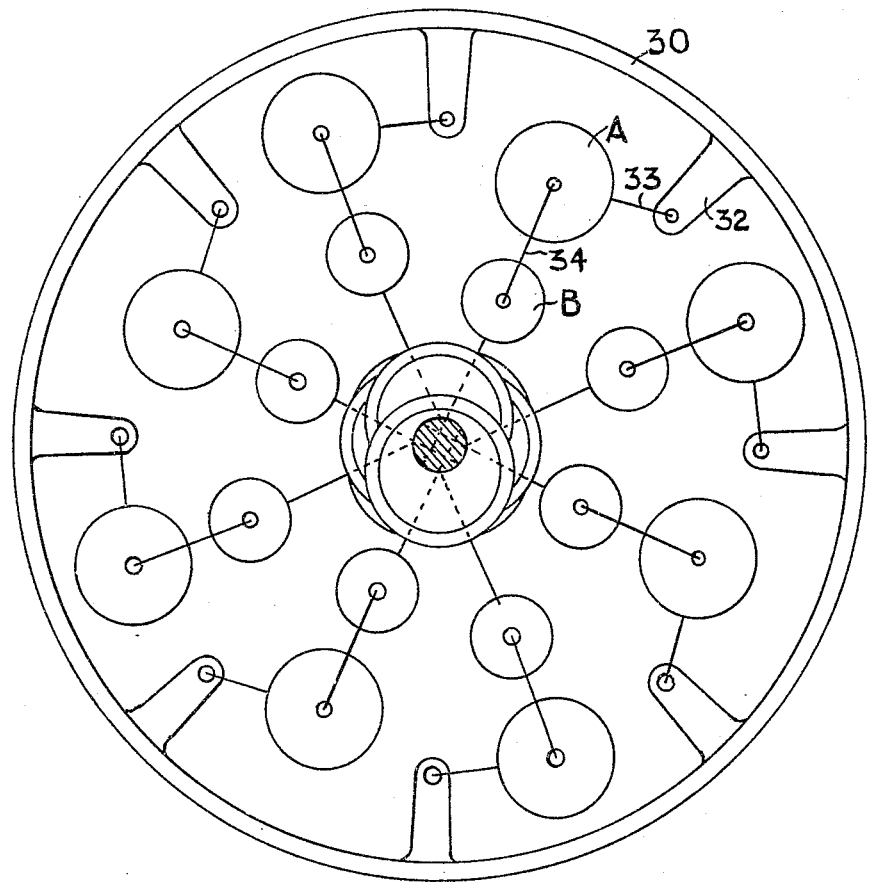
Figure 4 is an end view, partly diagrammatic, of a modified construction embodying the invention employing eccentric forms.
Figure 5:
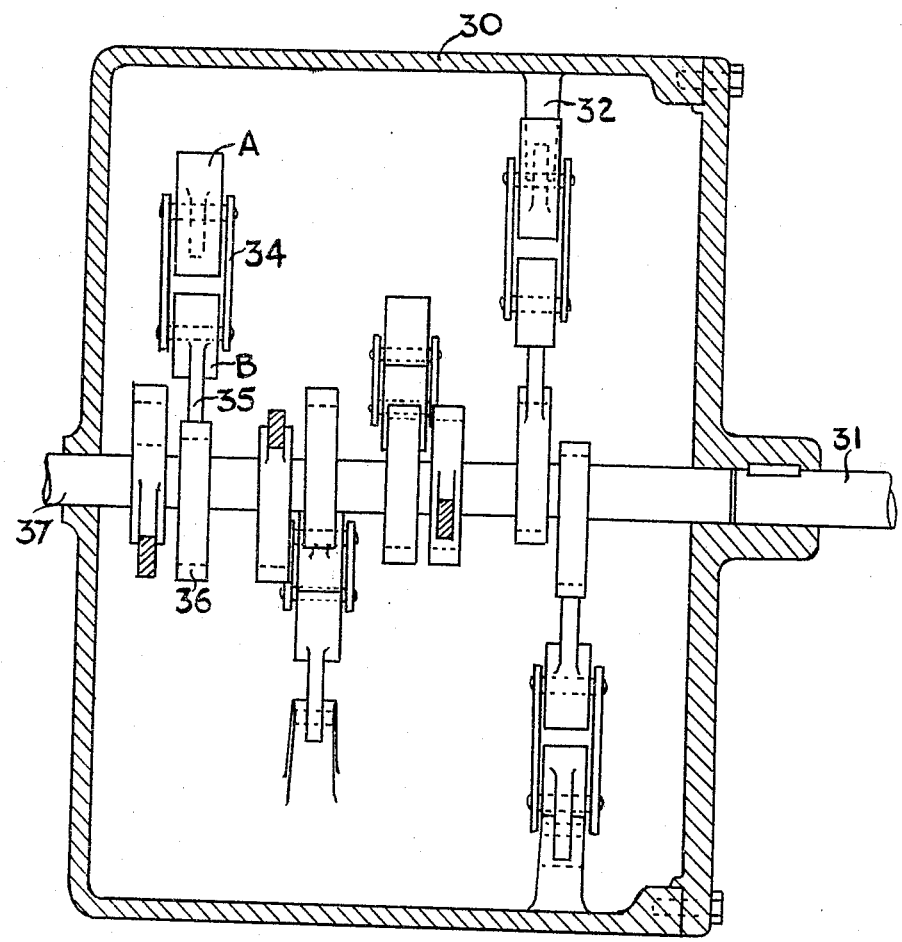
Figure 5 is a diagram in side elevation of the device shown in Figure 4.

In carrying out the invention in accordance with another mode as illustrated in Figures 4 and 5, the four-lobed cam of the previously described embodiment is replaced by eight eccentrics. The driving casing 30 keyed to the shaft 31 carries eight spaced lugs 32 to which the masses A are connected by means of links 33. Each mass A is connected by means of links 34 to a smaller mass B carried at the end of an arm 35 attached to the sheave 36 of an eccentric mounted on the driven shaft 37. There are eight eccentrics mounted at convenient distances apart on the shaft 37 which is journalled to rotate freely in the driving casing 30, the angular arrangement of the eccentrics being such that they are spaced uniformly about the axis of the gear.

On rotation of the driving casing 30 the linked masses A and B will be carried round an orbital path, and assuming the driven shaft to be stationary, each mass will move from a point having a maximum distance from the centre to a point having a minimum distance from the centre and back again during one revolution of the driver. It will thus be evident that the inward and outward movements of the masses A and B during one revolution about their eccentric are equivalent to the similar movements of masses A and B during inward and outward cam phases and, consequently, the principles of operation discussed in connection with the previously described embodiment are equally applicable to the present form using eccentrics instead of cams. It will be understood that in designing the gear allowance must be made for the modified form of the locus of the mass B due to its being derived from a circular path about the centre of the eccentric, and also for the distinctness of the mass B from the mass A when considering their ratio. Manifestly the number of eccentrics and power transfer devices may be varied as desired, to afford any required number of impulses per revolution.

In centrifugally actuated power transfer devices it may be convenient to combine the two masses A and B in one construction, in which case the combined mass is arranged to effect its dual purpose by separately employing its transverse and polar mass functions or otherwise accelerating the single mass in two directions. As has already been explained, the construction shown in Figure 3 partially embodies this principle, the pole selected being the centre of the ring 13, and the construction shown in Figure 4 may more completely exemplify the method if the masses A and B are replaced by a single mass of equal total value having its centre at the point of intersection of the links 33 and 34 and having an equal polar moment of inertia about the point of intersection. However, any other construction may be selected which will result in the desired separation of the mass functions and allow of component or effectively independent acceleration being developed, for the purpose of carrying the invention into effect.

Figure 6:
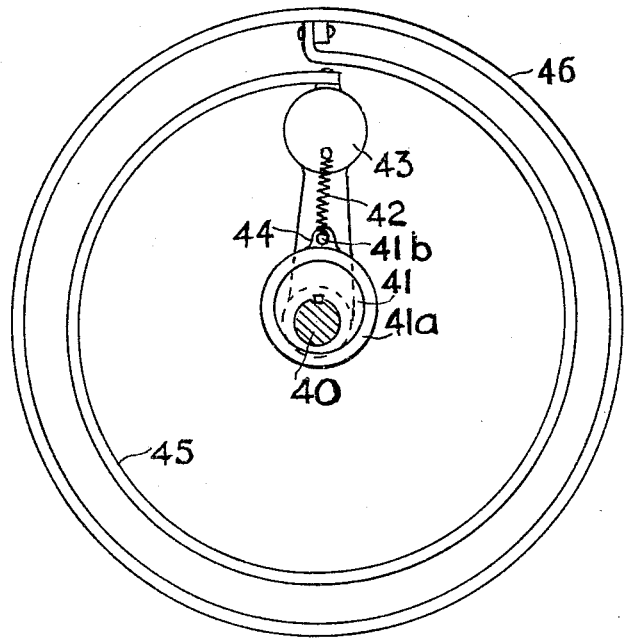
Figure 6 is a diagrammatic view of a further modification employing a resilience in the form of springs.

In carrying the invention into effect according to another mode (as illustrated by way of example in Figure 6) the resilience of springs is employed in the storage and transfer of energy. An eccentric 41 is mounted on the driving shaft 40 and carries a sheave 41a. A mass 43 is mounted on an arm 44 which is freely rotatable about the shaft 40 and is connected to a pin 41b on the eccentric sheave by means of a spring 42. The mass 43 is connected to a driving casing 46 by means of a spring 45 of spiral form. For convenience in this modification of the invention reference is made to the components of a single power transfer device but it is to be understood that actually a plurality of any convenient number would be employed.

On rotation of the shaft 40 the eccentric 41 will also be rotated and the pin 41b on the eccentric sheave will describe a circular path so that the spring 42 is periodically extended to exert a pull first to one side and then to the other side of the plane passing through the axis of rotation and the centre of the mass 43. Assuming the direction of rotation of the shaft 40 to be clockwise it will be clear that both positive and negative impulses will be applied to the mass 43, but as the mass in tending to follow the eccentric also tends to increase the angle through which the driver moves in applying the positive impulse and also after having been arrested by the spring 45, its negative motion tends to shorten the angle through which the driver moves in applying the negative impulse, it will be seen that more work is delivered to the mass in a positive sense than in a negative sense, the net ensuing moment applied to that driving member through the spring 45 being therefore positive.

It is to be understood that the springs, mass and eccentric have exactly parallel functions to those of the elements shown in Figure 3 and, consequently, the theory of operation as described with reference to that figure is equally applicable to the constructional form at present under consideration. Thus the absorption of energy from the driver is due to the straining of the spring 42, this action being comparable to the work done on the mass A of Figure 3 moving radially. Under the pull of the extended spring 42 the mass 43 tends to accelerate and this acceleration performs the function of storing the absorbed work in kinetic form as is done with the mass B as previously described. The straining of the spring 45 which is coupled to the driven member is equivalent to the reaction of the mass B on the inward cam slope, the consequent reduction of the angular velocity of the mass 43 being exactly represented by the similar negative acceleration of the mass B when being retracted. The partial collapsing of the spring 45 on the forward motion of the driven member results from the absorption by the driven member of the energy imparted to the spring 45 on the slowing up of the mass 43. The unabsorbed balance of the work imparted to the spring 45 is returned to the mass 43. If the driven member does not move, the mass 43 reabsorbs the energy from the spring 45 to an extent depending on the natural frequency of the system comprising the mass 43 and spring 45 as compared with the frequency of the impulses delivered from the driving shaft. Under these conditions a rearward movement of the mass 43 reduces the angle through which the driving shaft exerts its movement and, therefore, reduces the energy absorbed from the driver the remainder of the energy necessary for extending the spring 42 being supplied by the mass 43. When the energy absorbed from the spring 45 in rearward motion of the mass 43 is less than that required to complete the extension of the spring 42 the rearward motion of the mass 43 is checked and its forward movement recommences, thus maintaining a positive moment on the driven member 46 but absorbing no net energy from the driver.

Figure 7:
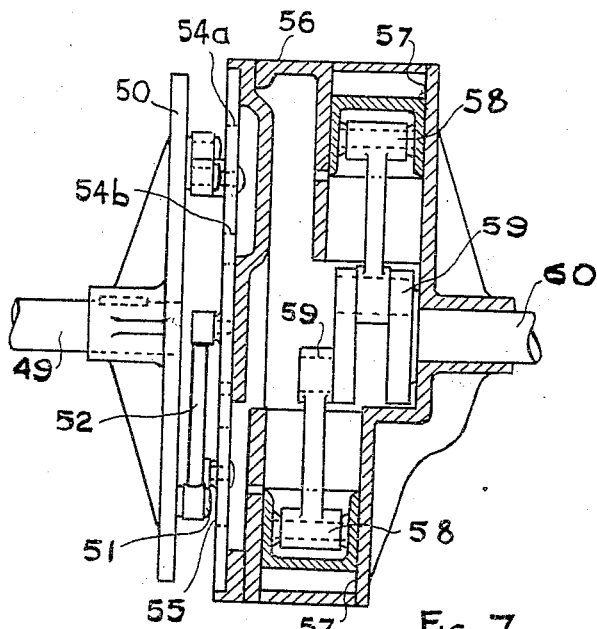
Figure 7 is a diagrammatic side view, partly in section, of a further modification employing a combination of cam form and a pneumatic resilience.
Figure 8:
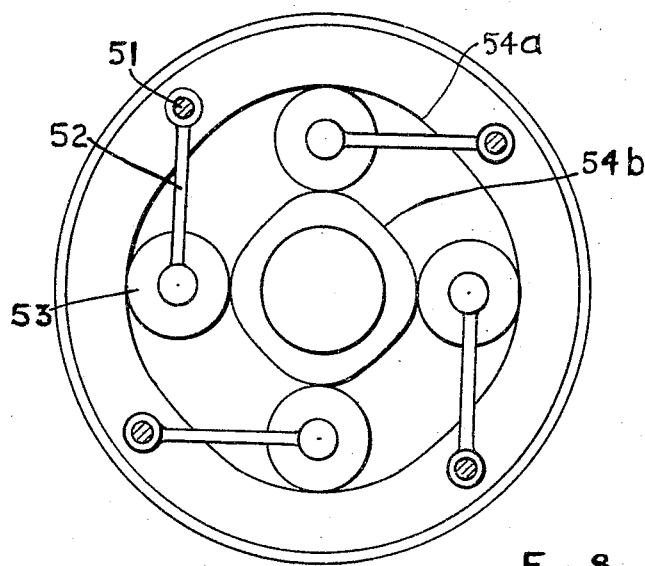
Figure 8 is a diagrammatic end view of a part of the modification shown in Figure 7.

According to another mode of carrying out the invention, the storage and transmission of energy is effected through the agency of a combination of resilient or elastic members with revolving masses acting on cams (see Figures 7 and 8). The driving shaft 49 carries a disc 50 on which four pins 51 are mounted to form pivotal anchorages for links 52 carrying the roller masses 53. These latter are adapted to engage and run on the internal and external cam surfaces 54b, 54a (which may be separately arranged as the cams 10 and 12 in Figure 1) carried by a plate 55 attached to a casing 56 which is mounted for free rotation upon the driven shaft 60. Incorporated with the casing 56 is a number of pneumatic buffer cylinders 57 (two in the present instance) in which pistons 58 may slide, the pistons being connected by piston rods to cranks 59 secured to the driven shaft 60. On rotation of the driving shaft the masses 53 will be carried round and the reactions of the induced centrifugal forces on the four-lobed cam surface 54a will result in the transmission of periodic moments or torque impulses to the casing element 56 which may be considered as an inertia member resiliently connected to the driven shaft through the medium of the buffer cylinders 57. The oscillations of the casing element 56 will accordingly be available for transmitting energy to the driven shaft through the pneumatic connection or returning it to the driver depending on the existing load conditions. In this example the cam 54a and the mass represented by the casing 56 constitute an inversion of the mass B and cam of Figure 3. The mass 53 which is the equivalent of mass A is directly coupled to the driver and delivers its energy through the cam to the casing element 56 instead of to the mass B by reaction from the outward cam. Similarly the pneumatic connection between the casing element 56 (which is the equivalent of mass B) and the driven shaft 60 is equivalent to the spring 45 of Figure 6 which is again equivalent to the combination of the mass B with the inward cam phase as described in connection with Figure 3.

It will be evident that by providing valves operated by suitable means in the heads of the pneumatic cylinders the pressure may be relieved, if desired, and the transmission of torque interrupted in a convenient and simple manner.

Where eccentrics or their equivalents are employed for transmitting the torque effort the deliberate, as distinct from the automatic, control of the delivered torque may be provided for in various ways, as by varying the throws of the eccentrics.

In many practical applications of the torque converting gear as, for example, in motor car work, it is necessary to make provision for reversing, and to this end an epicyclic reversing gear may be introduced between the torque converting gear and the driven shaft.

Having now particularly described and ascertained the nature of my said invention and in what manner the same is to be performed, I declare that what I claim is:—

1. A power transmission mechanism of the type described comprising co-axial independent driving and driven elements, a cam form having outward and inward phases carried by the driven member, and a power transfer device between the members including a mass comprising a freely rotatable annulus connected to the driving element and free to move outwardly and a second mass engaged by the inner periphery of the said annulus so as to be linked to the first said mass and adapted to engage the cam, the arrangement being such that during the outward cam phase, energy acquired from the driving element by the first said mass due to radial displacement accelerates the second mass while during the inward cam phase the stored energy is transmitted by the aid of the inward displacement of the first said mass to the driven element through the cam, or is returned to the driving element through the first said mass in accordance with the load conditions.

2. A power transmission mechanism comprising a driving member a driven member and a kinetic power transformer coupling the driving and driven members, comprising an accelerating means, an inertia coupling member having a path of revolution about the main axis and a centre of rotation independent of the said main axis, and counter-accelerating means, said accelerating means consisting in a connecting member constraining said coupling member to be revolved by the driving member and allowing said coupling member to be centrifugally displaced and rotated about its independent centre, said counter accelerating means consisting in a member linking an eccentric point on said coupling member to an excentric point on the driven member so that said centrifugal displacement may be arrested by the reaction due to rotation of the said coupling member and further said coupling member may be withdrawn radially through the distance of said displacement and said rotation reversed.

3. A power transmission mechanism comprising a rotatable driving member, an intermediate inertia member, a driven member, and a mass member, the said inertia member being revolvable about the axis of the driven member and having tangential freedom on a locus relative to the driven member determined by means comprised in the driven member the said mass member being coupled to the driving member so as to revolve therewith and, having radial freedom thereon, being further coupled to said inertia member so as to apply thereto a component of the centrifugal force resulting from the revolution of the said mass member.

4. A power transmission mechanism as claimed in claim 3 in which the means determining the locus of the inertia member comprises a cam on the driven member coacting with a roller on the inertia member.

5. A power transmission mechanism as claimed in claim 3 in which the means determining the locus of the inertia member comprises a crank pin on the driven member coupled by a connecting member to the inertia member.

6. Power transmission mechanism of the type described comprising rotatable driving and driven members, an inertia member revolvable about the axes of the driving and driven members, elastic means rotationally abutting on the driven member and the inertia member and second elastic means rotationally abutting on the inertia member and an eccentric point on the driven member about which the last mentioned abutment is rotatable.

7. Power transmission mechanism as claimed in claim 6 in which the driving and driven members are interchanged and the direction of energy transfer correspondingly reversed.

8. Power transmission mechanism comprising rotatable driving and driven members, an inertia member revolvable about the axes of the driving and driven members, elastic means rotationally abutting on the inertia member and the driven member, an actuating mass member coupled to the driving member to revolve therewith and, having radial freedom thereon, to apply a component of the centrifugal force resulting from said revolution to a locus determining construction comprised in said inertia means and limiting said radial freedom of the mass member.

9. Power transmission mechanism as claimed in claim 8 in which the locus determining construction comprises a cam mounted on the inertia member co-acting with a roller on the mass member.

10. Power transmission mechanism as claimed in claim 8 in which the locus determining construction comprises a crank pin on the inertia member coupled by a connecting member to the mass member.

11. Power transmission mechanism of the type described comprising rotatable driving and driven members, a coupling system, containing both an inertia member having a degree of tangential freedom relatively to the driving member and resilient means, successively set into oscillation and damped by respective independent means actuated by the driving and driven members.

12. Power transmission mechanism as claimed in claim 11 in which the resilient means comprises a centrifugally actuated mass member coupled to the inertia member by a connecting member and in which the oscillating means comprises a second connecting member coupling the said mass member to the driving member so as to have radial freedom thereon but to be revolved therewith.

13. Power transmission mechanism as claimed in claim 11 in which the oscillating means comprises the abutment on the driving member of a resilient means intermediate between and co-acting with the driving member and the inertia member, the said resilient means comprising an elastic member.

14. Power transmission mechanism comprising rotatable driving and driven members, an oscillable coupling system containing an inertia member and resilient means and damping means comprising a locus determining construction mounted on the driving member and co-acting with the inertia member to neutralize the acceleration of the said inertia member by a centrifugally actuated mass member coupled to said inertia member by a connecting member.

15. Power transmission mechanism comprising rotatable driving and driven members, an oscillable coupling system containing an inertia member and resilient means and damping means comprising an abutment on the driven member of a resilient means intermediate between and co-acting with the inertia member the last said resilient means comprising an elastic member.

In testimony whereof I have signed my name to this specification.

JAMES LAST.